(No Model.)

E. FIRTH & A. & I. TOMPKINS.
CAPPING AXLE NUTS.

No. 379,214.  Patented Mar. 13, 1888.

Witnesses.

Inventor.
Edwin Firth,
Albert Tompkins and
Ira Tompkins,
by C. A. Snow & Co.
their Attorneys N. PETERS. Photo-Lithographer. Washington, D. C.

UNITED STATES PATENT OFFICE.

EDWIN FIRTH, ALBERT TOMPKINS, AND IRA TOMPKINS, OF TROY, NEW YORK.

CAPPING AXLE-NUTS.

SPECIFICATION forming part of Letters Patent No. 379,214, dated March 13, 1888.

Application filed December 1, 1887. Serial No. 256,688. (No model.)

*To all whom it may concern:*

Be it known that we, EDWIN FIRTH, ALBERT TOMPKINS and IRA TOMPKINS, citizens of the United States, residing at Troy, in the county of Rensselaer and State of New York, have invented a new and useful Improvement in Securing Caps in the Outer Ends of Nuts, of which the following is a specification.

Our invention relates to an improvement in axle-nuts and in the method of securing caps in the outer ends of the nuts, so as to provide the latter with oil-chambers; and it consists, first, in an axle-nut having an opening at its outer end covered by a cap, which is formed separately from the nut and then secured thereto, so as to form an oil-chamber in the outer end of the nut; secondly, in the method of securing the cap to the nut, consisting in counterboring the outer end of the nut, so as to form a thin annular flange, placing the cap in the counterbore within the flange, and then spinning the edge of the flange down upon the edge of the cap, as will be more fully set forth hereinafter, and particularly pointed out in the claims.

Figure 1:
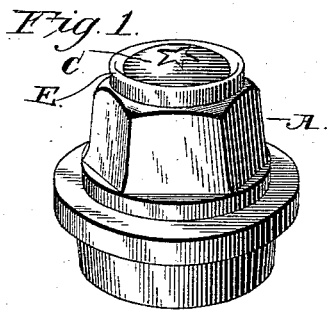
Figure 2:
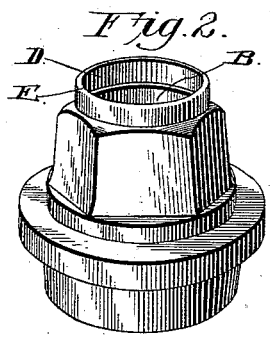
Figure 4:
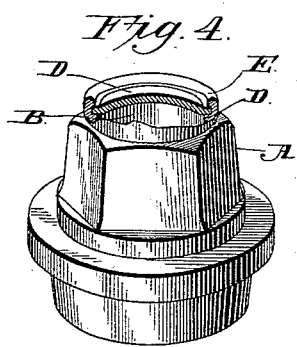
Figure 3:
Figure 5:
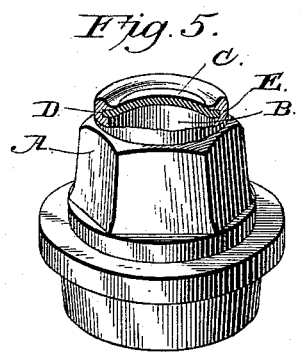
Figure 6:
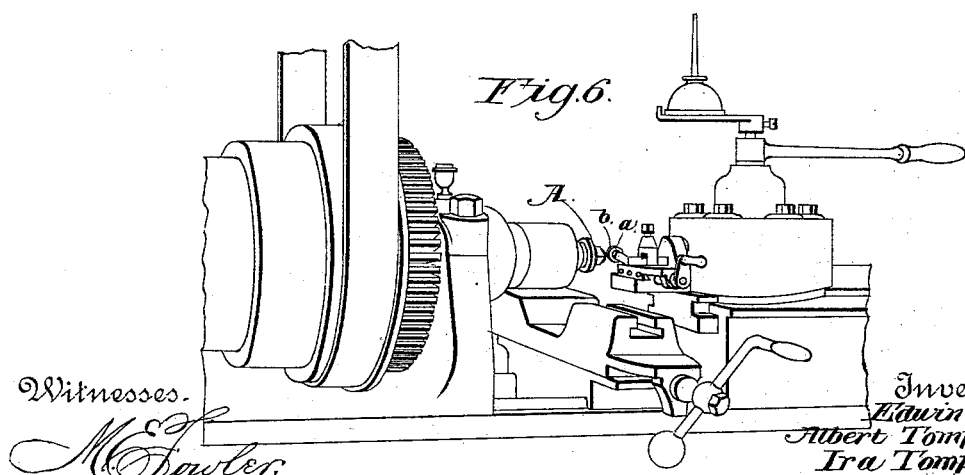

In the accompanying drawings, Figure 1 is a perspective view of an axle-nut embodying our improvements. Fig. 2 is a similar view of the same, showing the counterbore in which the cap is adapted to be placed. Fig. 3 is a similar view of the cap adapted to be placed in the counterbore. Fig. 4 is a similar view of the nut with the cap arranged in its counterbore and partly secured therein. Fig. 5 is a similar view of the nut after the cap is completely secured in position. Fig. 6 is a perspective view of a portion of a lathe provided with devices adapted to spin the flange over the edge of the cap.

A represents an axle-nut, which is provided in its outer end with an enlarged chamber or recess, B, which projects beyond the spindle on which the nut is adapted to be screwed. In the outer end of the nut is secured a cap, C, which is preferably made of brass or other soft metal, but which may be made of any suitable material, and is secured to the nut so as to cover the outer side of the chamber B, and thereby adapt the latter to contain oil. In order to secure the said cap to the nut, we first provide the outer end of the latter with a counterbore, D, of suitable depth, and thereby form a thin flange, E, around the said counterbore, as shown in Fig. 2.

The nut remains on the spindle of the lathe after the counterbore is formed therein. The cap is placed in the counterbore with its convex side outward, and the mechanic causes a spinning-tool such as shown in Fig. 6, and provided with a wheel, *a*, having an annular groove, *b*, to bear against the outer edge of the flange on the nut. The lathe is then caused to rotate the nut at the rate of about two hundred revolutions per minute, and the tool is pressed against the outer edge of the flange, so as to spin or swage the same down upon the edge of the cap, as shown in Figs. 4 and 5, and thereby firmly secure the cap in position in the nut. After this the cap and nut may be nickel-plated, lacquered, or finished in any other preferred manner, and is ready for the market.

The tool for spinning the flange of the nut and holding the cap in place is more particularly described in our application for Letters Patent of even date herewith, to which reference is hereby made.

Having thus described our invention, we claim—

1. An axle-nut having the cap formed separately from the nut and secured in its outer end, substantially as described.

2. A vehicle-axle nut having the chamber B in its outer end, the outer side of said chamber being formed by a cap, C, which is formed separately from the nut and is then secured thereto, substantially as described.

3. The vehicle-axle nut having the counterbore in its outer end and the annular flange E, the cap arranged in the counterbore, and secured therein by spinning or swaging the flange down upon the outer edge of the cap, substantially as described.

4. The method of securing a cap to an axle-nut, consisting, first, in forming a counterbore in the axle-nut and a flange around the same; secondly, in placing the cap in the counterbore; third, in swaging or spinning the edge of the flange down upon the outer edge of the cap, substantially as described.

5. The method of securing a cap in the outer end of an axle-nut, consisting in swaging or spinning the edge of the outer end of the nut down upon the cap, as set forth.

6. An axle-nut having the thin annular flange E at its outer end, and the cap held in place by spinning or swaging the flange down upon the cap, as set forth.

In testimony that we claim the foregoing as our own we have hereto affixed our signatures in presence of two witnessess.

EDWIN FIRTH.
ALBERT TOMPKINS.
IRA TOMPKINS.

Witnesses:
WILLIAM KEMP,
F. N. MANN, Sr.